(12) United States Patent
Cheng

(10) Patent No.: US 6,443,532 B1
(45) Date of Patent: Sep. 3, 2002

(54) SPOKED WHEEL ASSEMBLY FOR A BICYCLE

(75) Inventor: Victor Cheng, Miao-Li Hsien (TW)

(73) Assignee: Formula Engineering Inc., Taichung Hsien (TW)

( * ) Notice: Subject to any disclaimer, the term of this patent is extended or adjusted under 35 U.S.C. 154(b) by 0 days.

(21) Appl. No.: 09/794,574

(22) Filed: Feb. 27, 2001

(51) Int. Cl.⁷ .................................................. B60B 1/00
(52) U.S. Cl. .......................................... 301/55; 301/104
(58) Field of Search ............................. 301/55, 56, 58, 301/59, 104

(56) References Cited

U.S. PATENT DOCUMENTS 512,453 A * 1/1894 Stenersen et al.
718,094 A * 1/1903 Clement
2,938,738 A * 5/1960 La Rue et al.
5,938,293 A * 8/1999 Dietrich

* cited by examiner

*Primary Examiner*—Russell D Stormer
(74) *Attorney, Agent, or Firm*—Ladas & Parry

(57) ABSTRACT

A spoked wheel assembly includes a wheel hub with right and left end flanges spaced apart from each other along an axis, a wheel rim around the hub, left spokes respectively coupled to the left end flange at left spoke mounting holes and to the rim at spoke mounting points, and right spokes respectively coupled to the right end flange at right spoke mounting holes and to the rim at other ones of the spoke mounting points. The right and left spokes are arranged alternately in one of a first spoke pair disposed along substantially parallel planes and a second spoke pair disposed along intersecting planes. Thus, the rigidity of the rim in the direction of the axis can be increased.

5 Claims, 5 Drawing Sheets

SPOKED WHEEL ASSEMBLY FOR A BICYCLE

BACKGROUND OF THE INVENTION

1. Field of the Invention

This invention relates to a bicycle wheel, more particularly to a spoked wheel assembly for a bicycle.

2. Description of the Related Art

Referring to FIGS. 1 and 2, a conventional spoked wheel assembly is shown to include a wheel hub 30 with an axis and right and left end flanges 31,32 that are spaced apart from each other along the axis. The left end flange 31 is formed with eight angularly equidistant left spoke mounting holes 311. The right end flange 32 is formed with eight right spoke mounting holes 321 which are aligned respectively with the left spoke mounting holes 311 in the direction of the axis. An annular wheel rim 41 for mounting a wheel tire 40, is disposed around the wheel hub 30, and is formed with sixteen angularly equidistant spoke mounting points 411 which are arranged around the axis. Each of eight left spokes 11 has two ends which are coupled to one of the left spoke mounting holes 311 and one of the spoke mounting points 411. Each of eight right spokes 21 has two ends which are coupled to one of the right spoke mounting holes 321 and one of the spoke mounting points 411. While the conventional arrangement of the left and right spokes 11,21 results in enhanced rigidity of the wheel rim 41 in a direction radial to the axis, the rigidity of the wheel rim 41 in a direction of the axis is relatively poor.

SUMMARY OF THE INVENTION

The object of the present invention is to provide a spoked wheel assembly that is capable of overcoming the aforementioned drawback.

According to this invention, the spoked wheel assembly includes a wheel hub with an axis, and left and right end flanges which are spaced apart from each other along the axis and which are disposed on opposite sides of a central wheel plane transverse to the axis. The left end flange is formed with first to eighth left spoke mounting holes which are consecutively and circumferentially arranged around the axis in a clockwise direction when viewed from a left side of the wheel hub. The right end flange is formed with first to eighth right spoke mounting holes which are respectively aligned with the first to eighth left spoke mounting holes in the direction of the axis. An annular wheel rim is disposed around the wheel hub, and is formed with first to sixteenth spoke mounting points which are consecutively and circumferentially arranged around the axis in the clockwise direction when viewed from the left side of the wheel hub. A first left spoke has a first end coupled to the left end flange at the first left spoke mounting hole, and a second end coupled to the wheel rim at the first spoke mounting point. A first right spoke has a first end coupled to the right end flange at the fourth right spoke mounting hole, and a second end coupled to the wheel rim at the second spoke mounting point. The first left and right spokes are disposed along substantially parallel planes when viewed from the left side of the wheel hub. A second left spoke has a first end coupled to the left end flange at the second left spoke mounting hole, and a second end coupled to the wheel rim at the fifteenth spoke mounting point. A second right spoke has a first end coupled to the right end flange at the first right spoke mounting hole, and a second end coupled to the wheel rim at the sixteenth spoke mounting point. The second left and right spokes are disposed along intersecting planes when viewed from the left side of the wheel hub. A third left spoke has a first end coupled to the left end flange at the third left spoke mounting hole, and a second end coupled to the wheel rim at the fifth spoke mounting point. A third right spoke has a first end coupled to the right end flange at the sixth right spoke mounting hole, and a second end coupled to the wheel rim at the sixth spoke mounting point. The third left and right spokes are disposed along substantially parallel planes when viewed from the left side of the wheel hub. A fourth left spoke has a first end coupled to the left end flange at the fourth left spoke mounting hole, and a second end coupled to the wheel rim at the third spoke mounting point. A fourth right spoke has a first end coupled to the right end flange at the third right spoke mounting hole, and a second end coupled to the wheel rim at the fourth spoke mounting point. The fourth left and right spokes are disposed along intersecting planes when viewed from the left side of the wheel hub. A fifth left spoke has a first end coupled to the left end flange at the fifth left spoke mounting hole, and a second end coupled to the wheel rim at the ninth spoke mounting point. A fifth right spoke has a first end coupled to the right end flange at the eighth right spoke mounting hole, and a second end coupled to the wheel rim at the tenth spoke mounting point. The fifth left and right spokes are disposed along substantially parallel planes when viewed from the left side of the wheel hub. A sixth left spoke has a first end coupled to the left end flange at the sixth left spoke mounting hole, and a second end coupled to the wheel rim at the seventh spoke mounting point. A sixth right spoke has a first end coupled to the right end flange at the fifth right spoke mounting hole, and a second end coupled to the wheel rim at the eighth spoke mounting point. The sixth left and right spokes are disposed along intersecting planes when viewed from the left side of the wheel hub. A seventh left spoke has a first end coupled to the left end flange at the seventh left spoke mounting hole, and a second end coupled to the wheel rim at the thirteenth spoke mounting point. A seventh right spoke has a first end coupled to the right end flange at the second right spoke mounting hole, and a second end coupled to the wheel rim at the fourteenth spoke mounting point. The seventh left and right spokes are disposed along substantially parallel planes when viewed from the left side of the wheel hub. An eighth left spoke has a first end coupled to the left end flange at the eighth left spoke mounting hole, and a second end coupled to the wheel rim at the eleventh spoke mounting point. An eighth right spoke has a first end coupled to the right end flange at the seventh right spoke mounting hole, and a second end coupled to the wheel rim at the twelfth spoke mounting point. The eighth left and right spokes are disposed along intersecting planes when viewed from the left side of the wheel hub. Therefore, the construction as such can increase the rigidity of the wheel rim in the direction of the axis.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
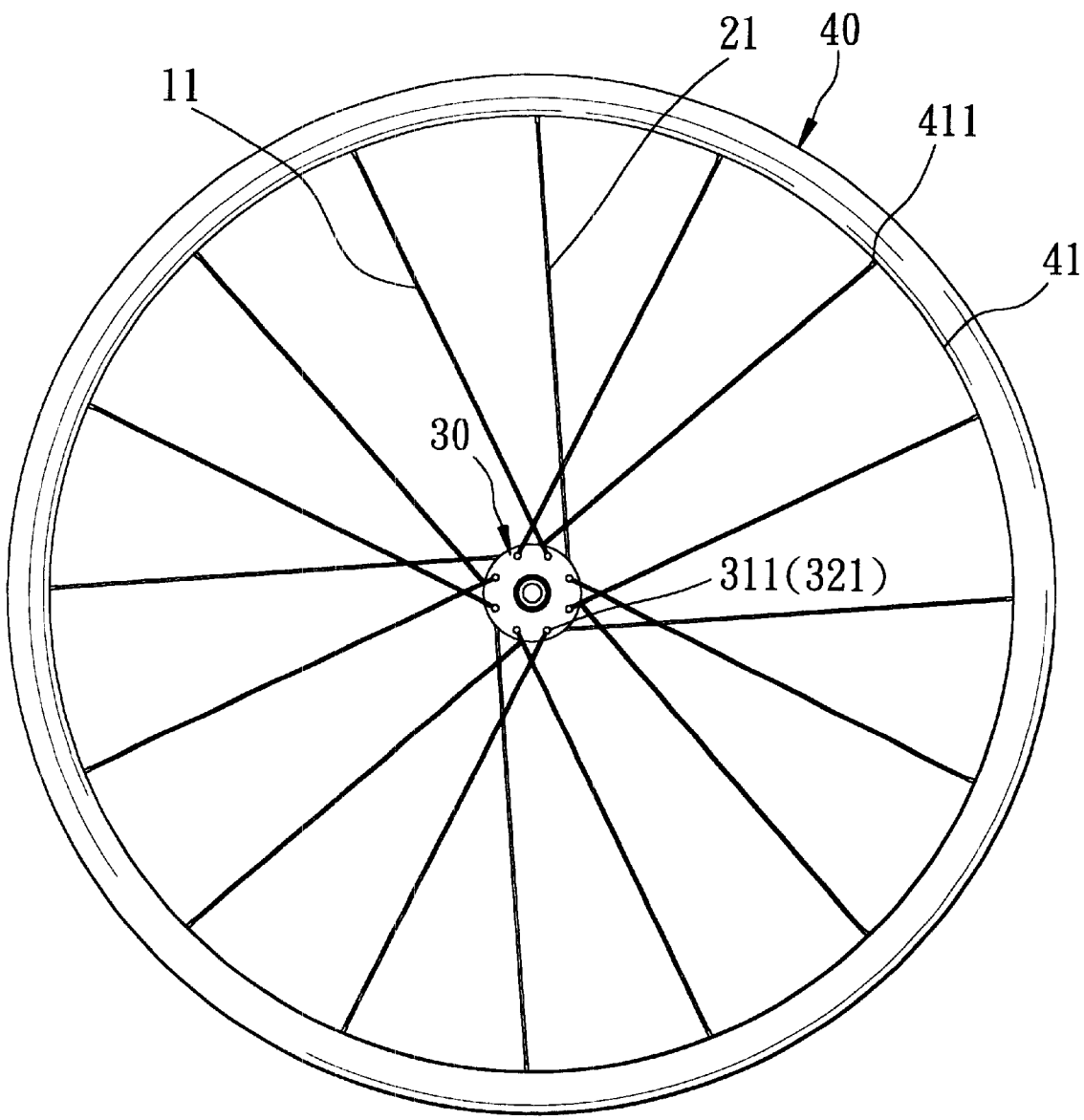
FIG. 1 is a schematic side view of a conventional spoked wheel assembly.
Figure 2:
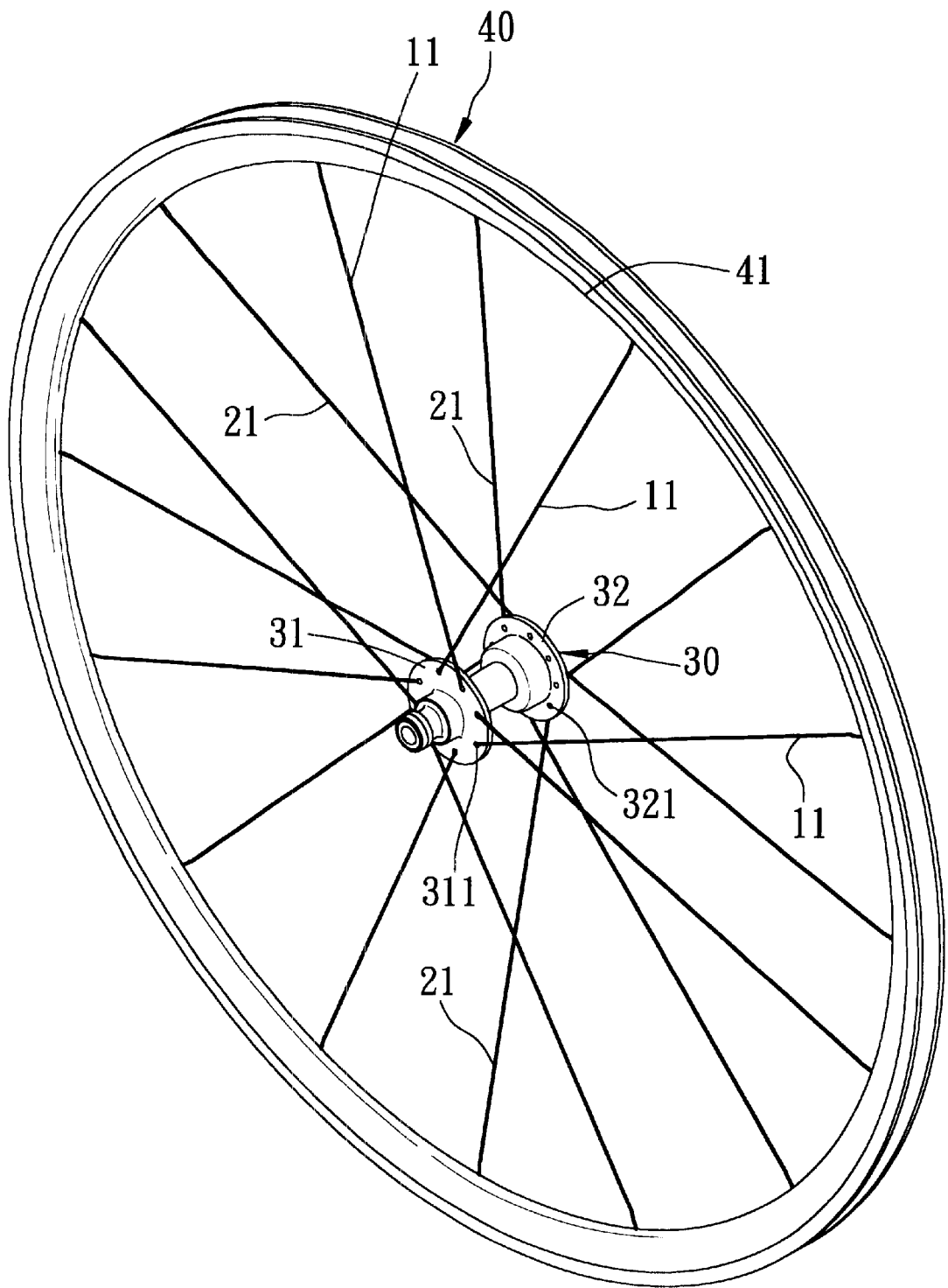
FIG. 2 is a perspective view of the conventional spoked wheel assembly.
Figure 3:
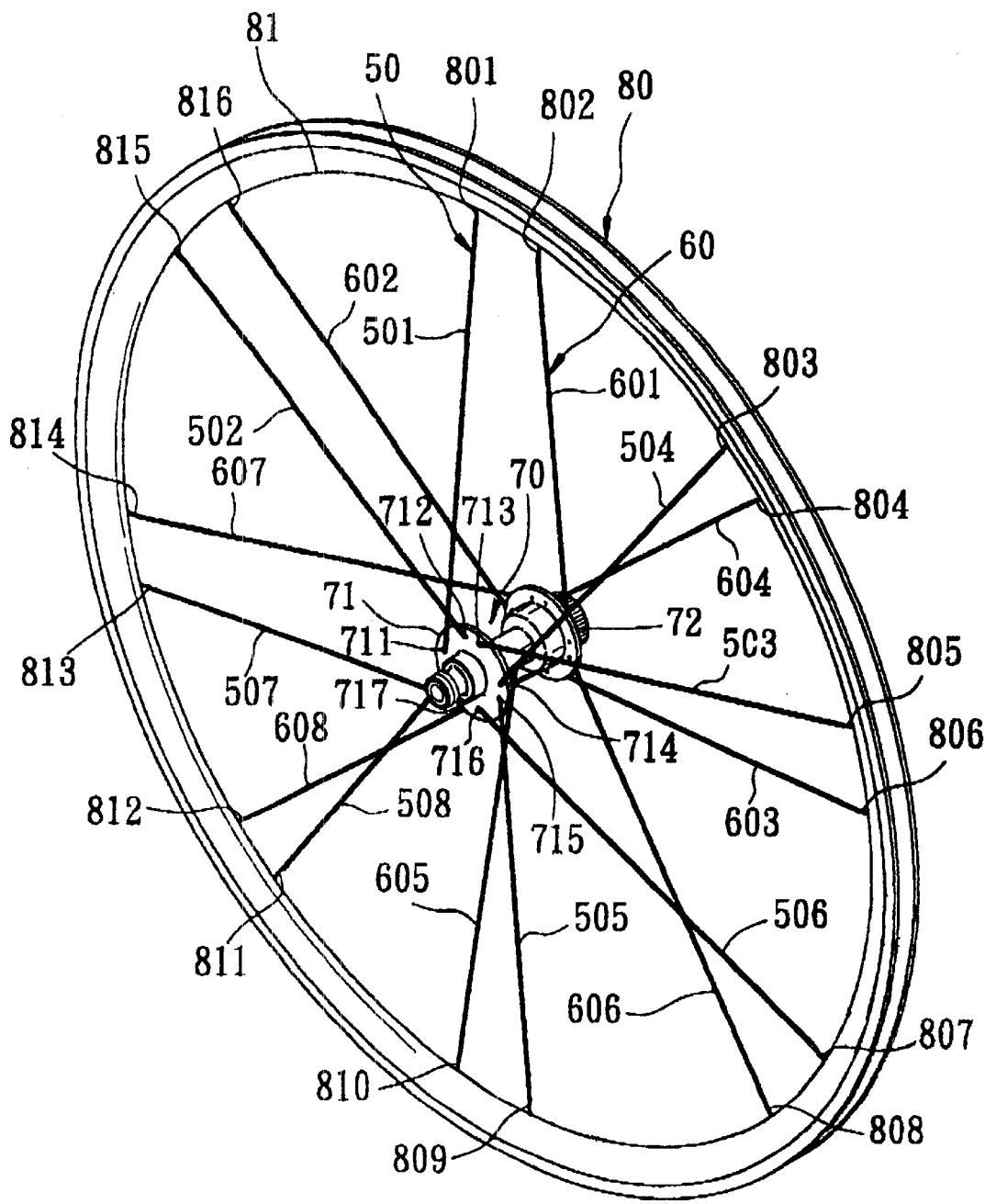
FIG. 3 is a perspective view of a preferred embodiment of a spoked wheel assembly according to this invention.

Referring to FIG. 3, the preferred embodiment of the spoked wheel assembly according to the present invention is shown to comprise a wheel hub 70, an annular wheel rim 81 for mounting a wheel tire 80, and a plurality of left and right spokes 50,60.

The wheel hub 70 has an axis, and left and right end flanges 71,72 which are spaced apart from each other along the axis and which are disposed on opposite sides of a central wheel plane transverse to the axis.

Figure 4:
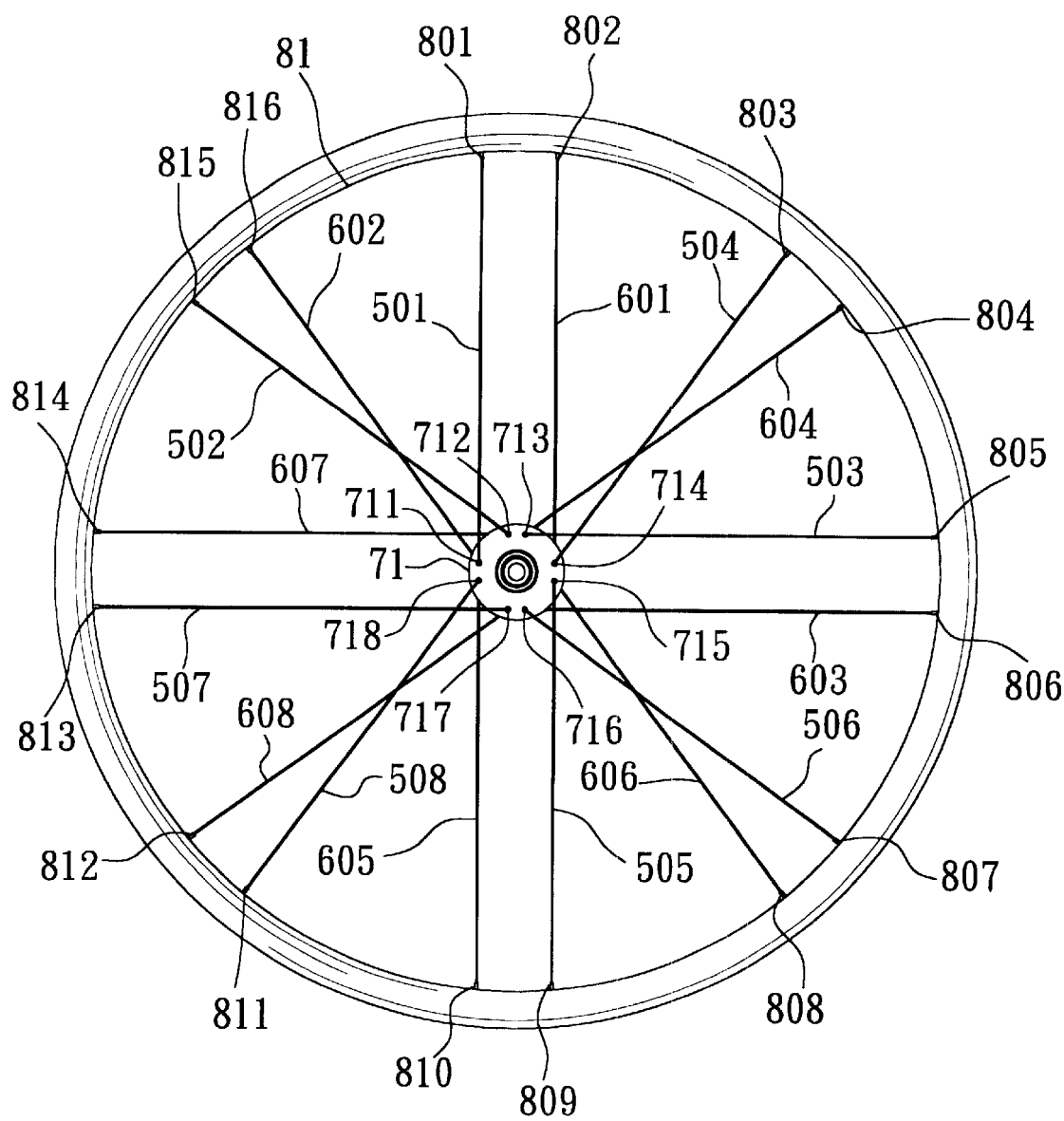
FIG. 4 is a side view of the preferred embodiment when viewed from the left side of a wheel hub.
Figure 5:
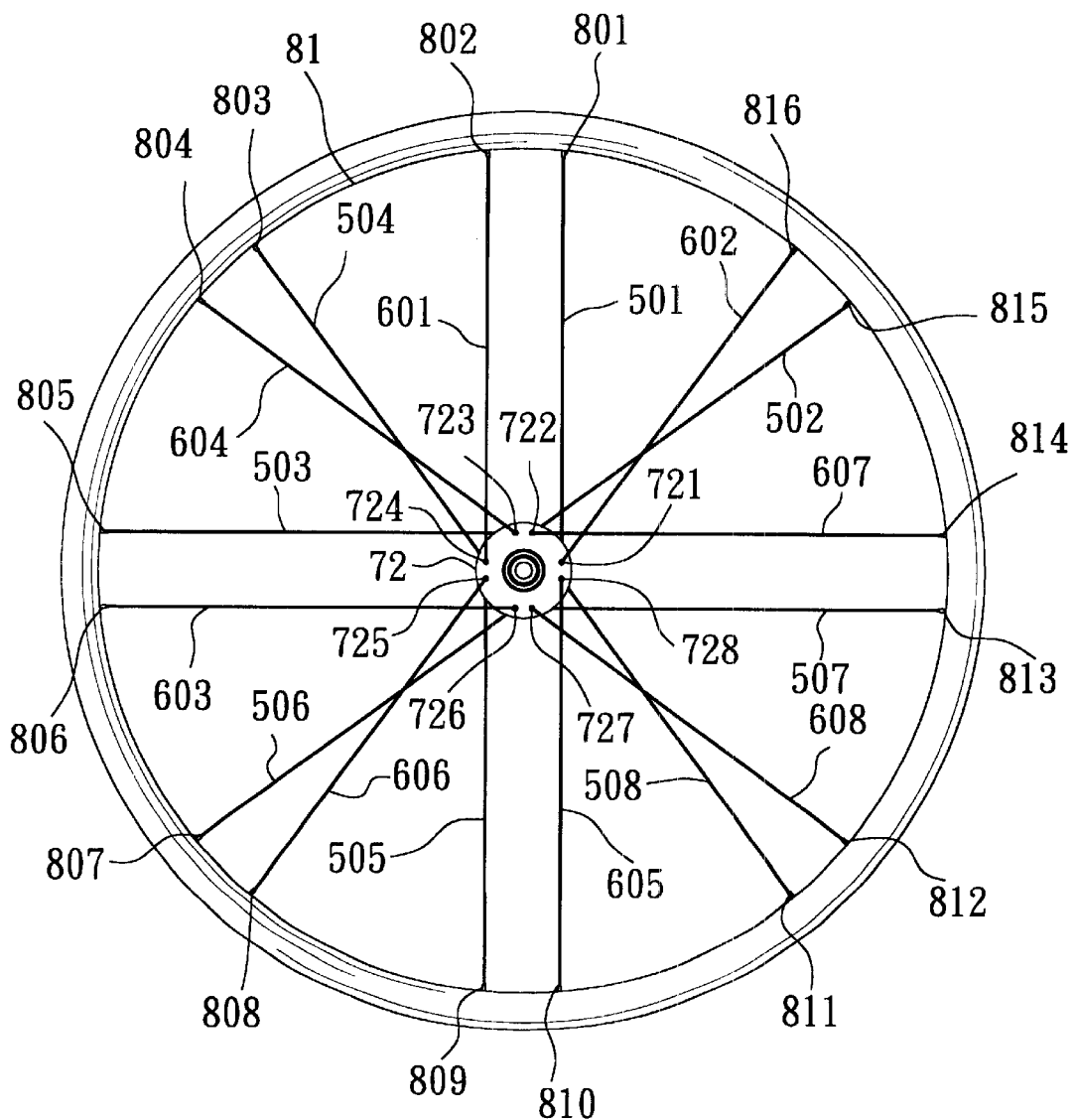
FIG. 5 is a side view of the preferred embodiment when view from the right side of the wheel hub.

For the sake of brevity, the components of this invention are described with reference to the left side of the wheel hub 70. With reference to FIGS. 4 and 5, the left end flange 71 is formed with first to eighth left spoke mounting holes 711,712,713,714,715,716,717,718 which are consecutively and circumferentially arranged around the axis in a clockwise direction when viewed from the left side of the wheel hub 70. The right end flange 72 is formed with first to eighth right spoke mounting holes 721,722,723,724,725,726,727, 728 which are respectively aligned with the first to eighth left spoke mounting holes 711 to 718 in the direction of the axis.

The wheel rim 81 is disposed around the wheel hub 70, and is formed with first to sixteenth spoke mounting points 801,802,803,804,805,806,807,808,809,810,811,812,813, 814, 815,816 which are consecutively and circumferentially arranged around the axis in the clockwise direction when viewed from the left side of the wheel hub 70. Preferably, the first to sixteenth spoke mounting points 801 to 816 are arranged to form a circle that is centered at the axis.

The left spokes 50 include first to eighth left spokes 501 to 508, whereas the right spokes 60 include first to eighth right spokes 601 to 608. The descriptions thereof are as follows:

The first left spoke 501 has a first end which is coupled to the left end flange 71 at the first left spoke mounting hole 711, and a second end which is coupled to the wheel rim 81 at the first spoke mounting point 801.

The first right spoke 601 has a first end which is coupled to the right end flange 72 at the fourth right spoke mounting hole 724, and a second end which is coupled to the wheel rim 81 at the second spoke mounting point 802. The first left and right spokes 501,601 are disposed along substantially parallel planes when viewed from the left side of the wheel hub 70.

The second left spoke 502 has a first end which is coupled to the left end flange 71 at the second left spoke mounting hole 712, and a second end which is coupled to the wheel rim 81 at the fifteenth spoke mounting point 815.

The second right spoke 602 having a first end which is coupled to the right end flange 72 at the first right spoke mounting hole 721, and a second end which is coupled to the wheel rim 81 at the sixteenth spoke mounting point 816. The second left and right spokes 502,602 are disposed along intersecting planes when viewed from the left side of the wheel hub 70.

The third left spoke 503 has a first end which is coupled to the left end flange 71 at the third left spoke mounting hole 713, and a second end which is coupled to the wheel rim 81 at the fifth spoke mounting point 805.

The third right spoke 603 has a first end which is coupled to the right end flange 72 at the sixth right spoke mounting hole 726, and a second end which is coupled to the wheel rim 81 at the sixth spoke mounting point 806. The third left and right spokes 503,603 are disposed along substantially parallel planes when viewed from the left side of the wheel hub 70.

The fourth left spoke 504 has a first end which is coupled to the left end flange 71 at the fourth left spoke mounting hole 714, and a second end which is coupled to the wheel rim 81 at the third spoke mounting point 803.

The fourth right spoke 604 has a first end which is coupled to the right end flange 72 at the third right spoke mounting hole 723, and a second end which is coupled to the wheel rim 81 at the fourth spoke mounting point 804. The fourth left and right spokes 504,604 are disposed along intersecting planes when viewed from the left side of the wheel hub 70.

The fifth left spoke 505 has a first end which is coupled to the left end flange 71 at the fifth left spoke mounting hole 715, and a second end which is coupled to the wheel rim 81 at the ninth spoke mounting point 809.

The fifth right spoke 605 has a first end which is coupled to the right end flange 72 at the eighth right spoke mounting hole 728, and a second end which is coupled to the wheel rim 81 at the tenth spoke mounting point 810. The fifth left and right spokes 505,605 are disposed along substantially parallel planes when viewed from the left side of the wheel hub 70.

The sixth left spoke 506 has a first end which is coupled to the left end flange 71 at the sixth left spoke mounting hole 716, and a second end which is coupled to the wheel rim 81 at the seventh spoke mounting point 807.

The sixth right spoke 606 has a first end which is coupled to the right end flange 72 at the fifth right spoke mounting hole 725, and a second end which is coupled to the wheel rim 81 at the eighth spoke mounting point 808. The sixth left and right spokes 506,606 are disposed along intersecting planes when viewed from the left side of the wheel hub 70.

The seventh left spoke 507 has a first end which is coupled to the left end flange 71 at the seventh left spoke mounting hole 717, and a second end which is coupled to the wheel rim 81 at the thirteenth spoke mounting point 813.

The seventh right spoke 607 has a first end which is coupled to the right end flange 72 at the second right spoke mounting hole 722, and a second end which is coupled to the wheel rim 81 at the fourteenth spoke mounting point 814. The seventh left and right spokes 507,607 are disposed along substantially parallel planes when viewed from the left side of the wheel hub 70.

The eighth left spoke 508 has a first end which is coupled to the left end flange 71 at the eighth left spoke mounting hole 718, and a second end which is coupled to the wheel rim 81 at the eleventh spoke mounting point 811.

The eighth right spoke 608 has a first end which is coupled to the right end flange 72 at the seventh right spoke mounting hole 727, and a second end which is coupled to the wheel rim 81 at the twelfth spoke mounting point 812. The eighth left and right spokes 508,608 are disposed along intersecting planes when viewed from the left side of the wheel hub 70.

In addition, the planes, on which the first left and right spokes 501,601 and the fifth left and right spokes 505,605 are disposed, are generally transverse to the planes on which the third left and right spokes 503,603 and the seventh left and right spokes 507,607 are disposed.

The relative positions of the first to eighth left spoke mounting holes 711 to 718 are arranged in the following manner:

An angular distance between the first and eighth left spoke mounting holes 711,718 is shorter than that between the first and second left spoke mounting holes 711,712. An angular distance between the third and second left spoke mounting holes 713,712 is shorter than that between the third and fourth left spoke mounting holes 713,714. An angular distance between the fifth and fourth left spoke mounting holes 715,714 is shorter than that between the fifth and sixth left spoke mounting holes 715,716. An angular distance between the seventh and sixth left spoke mounting holes 717,716 is shorter than that between the seventh and eighth left spoke mounting holes 717,718. Note that the relative positions of the first to eighth right spoke mounting holes 721 to 728 are arranged in the same manner.

In addition, the relative positions of the first to sixteenth spoke mounting points 801 to 816 are arranged in the following manner:

An angular distance between the first and second spoke mounting points 801,802 is shorter than that between the first and sixteenth spoke mounting points 801,816. An angular distance between the third and fourth spoke mounting points 803,804 is shorter than that between the third and second spoke mounting points 803,802. An angular distance between the fifth and sixth spoke mounting points 805,806 is shorter than that between the fifth and fourth spoke mounting points 805,804. An angular distance between the seventh and eighth spoke mounting points 807,808 is shorter than that between the seventh and sixth spoke mounting points 807,806. An angular distance between the ninth and tenth spoke mounting points 809,810 is shorter than that between the ninth and eighth spoke mounting points 809, 808. An angular distance between the eleventh and twelfth spoke mounting points 811,812 is shorter than that between the eleventh and tenth spoke mounting points 811,810. An angular distance between the thirteenth and fourteenth spoke mounting points 813,814 is shorter than that between the thirteenth and twelfth spoke mounting points 813,812. An angular distance between the fifteenth and sixteenth spoke mounting points 815,816 is shorter than that between the fifteenth and fourteenth spoke mounting points 815,814.

With the construction as such, since there are different and alternate angular distances formed between two adjacent ones of the left spoke mounting holes 711 to 718, between two adjacent ones of the right spoke mounting holes 721 to 728, and between the adjacent ones of the spoke mounting points 801 to 816 on the wheel rim 81, and since the right and left spokes 501 to 508 and 601 to 608 are arranged alternately in one of a first spoke pair disposed substantially along parallel planes and a second spoke pair disposed along intersecting planes, aside from a neat and simple appearance for the wheel assembly, the rigidity of the wheel rim 81 in the direction of the axis can be increased.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A spoked wheel assembly, comprising:

a wheel hub having an axis, and left and right end flanges spaced apart from each other along said axis and disposed on opposite sides of a central wheel plane transverse to said axis, said left end flange being formed with first to eighth left spoke mounting holes consecutively and circumferentially arranged around said axis in a clockwise direction when viewed from a left side of said wheel hub, said right end flange being formed with first to eighth right spoke mounting holes respectively aligned with said first to eighth left spoke mounting holes in the direction of said axis;

an annular wheel rim disposed around said wheel hub, said wheel rim being formed with first to sixteenth spoke mounting points consecutively and circumferentially arranged around said axis in the clockwise direction when viewed from the left side of said wheel hub;

a first left spoke having a first end coupled to said left end flange at said first left spoke mounting hole, and a second end coupled to said wheel rim at said first spoke mounting point;

a first right spoke having a first end coupled to said right end flange at said fourth right spoke mounting hole, and a second end coupled to said wheel rim at said second spoke mounting point, said first left and right spokes being disposed along substantially parallel planes when viewed from the left side of said wheel hub;

a second left spoke having a first end coupled to said left end flange at said second left spoke mounting hole, and a second end coupled to said wheel rim at said fifteenth spoke mounting point;

a second right spoke having a first end coupled to said right end flange at said first right spoke mounting hole, and a second end coupled to said wheel rim at said sixteenth spoke mounting point, said second left and right spokes being disposed along intersecting planes when viewed from the left side of said wheel hub;

a third left spoke having a first end coupled to said left end flange at said third left spoke mounting hole, and a second end coupled to said wheel rim at said fifth spoke mounting point;

a third right spoke having a first end coupled to said right end flange at said sixth right spoke mounting hole, and a second end coupled to said wheel rim at said sixth spoke mounting point, said third left and right spokes being disposed along substantially parallel planes when viewed from the left side of said wheel hub;

a fourth left spoke having a first end coupled to said left end flange at said fourth left spoke mounting hole, and a second end coupled to said wheel rim at said third spoke mounting point;

a fourth right spoke having a first end coupled to said right end flange at said third right spoke mounting hole, and a second end coupled to said wheel rim at said fourth spoke mounting point, said fourth left and right spokes being disposed along intersecting planes when viewed from the left side of said wheel hub;

a fifth left spoke having a first end coupled to said left end flange at said fifth left spoke mounting hole, and a second end coupled to said wheel rim at said ninth spoke mounting point;

a fifth right spoke having a first end coupled to said right end flange at said eighth right spoke mounting hole, and a second end coupled to said wheel rim at said tenth spoke mounting point, said fifth left and right spokes being disposed along substantially parallel planes when viewed from the left side of said wheel hub;

a sixth left spoke having a first end coupled to said left end flange at said sixth left spoke mounting hole, and a second end coupled to said wheel rim at said seventh spoke mounting point;

a sixth right spoke having a first end coupled to said right end flange at said fifth right spoke mounting hole, and a second end coupled to said wheel rim at said eighth spoke mounting point, said sixth left and right spokes being disposed along intersecting planes when viewed from the left side of said wheel hub;

a seventh left spoke having a first end coupled to said left end flange at said seventh left spoke mounting hole, and a second end coupled to said wheel rim at said thirteenth spoke mounting point;

a seventh right spoke having a first end coupled to said right end flange at said second right spoke mounting hole, and a second end coupled to said wheel rim at said fourteenth spoke mounting point, said seventh left and right spokes being disposed along substantially parallel planes when viewed from the left side of said wheel hub;

an eighth left spoke having a first end coupled to said left end flange at said eighth left spoke mounting hole, and a second end coupled to said wheel rim at said eleventh spoke mounting point; and an eighth right spoke having a first end coupled to said right end flange at said seventh right spoke mounting hole, and a second end coupled to said wheel rim at said twelfth spoke mounting point, said eighth left and right spokes being disposed along intersecting planes when viewed from the left side of said wheel hub.

2. The spoked wheel assembly of claim 1, wherein said first to sixteenth spoke mounting points are arranged to form a circle that is centered at said axis.

3. The spoked wheel assembly of claim 1, wherein the planes, on which said first left and right spokes and said fifth left and right spokes are disposed, are generally transverse to the planes on which said third left and right spokes and said seventh left and right spokes are disposed.

4. The spoked wheel assembly of claim 1, wherein:

an angular distance between said first and eighth left spoke mounting holes is shorter than that between said first and second left spoke mounting holes;

an angular distance between said third and second left spoke mounting holes is shorter than that between said third and fourth left spoke mounting holes;

an angular distance between said fifth and fourth left spoke mounting holes is shorter than that between said fifth and sixth left spoke mounting holes; and an angular distance between said seventh and sixth left spoke mounting holes is shorter than that between said seventh and eighth left spoke mounting holes.

5. The spoked wheel assembly of claim 1, wherein:

an angular distance between said first and second spoke mounting points is shorter than that between said first and sixteenth spoke mounting points;

an angular distance between said third and fourth spoke mounting points is shorter than that between said third and second spoke mounting points;

an angular distance between said fifth and sixth spoke mounting points is shorter than that between said fifth and fourth spoke mounting points;

an angular distance between said seventh and eighth spoke mounting points is shorter than that between said seventh and sixth spoke mounting points;

an angular distance between said ninth and tenth spoke mounting points is shorter than that between said ninth and eighth spoke mounting points;

an angular distance between said eleventh and twelfth spoke mounting points is shorter than that between said eleventh and tenth spoke mounting points;

an angular distance between said thirteenth and fourteenth spoke mounting points is shorter than that between said thirteenth and twelfth spoke mounting points; and an angular distance between said fifteenth and sixteenth spoke mounting points is shorter than that between said fifteenth and fourteenth spoke mounting points.

* * * * *